United States Patent [19]
Paterson

[11] Patent Number: 5,666,110
[45] Date of Patent: Sep. 9, 1997

[54] HELICOPTER ENHANCED DESCENT AFTER TAKE-OFF WARNING FOR GPWS

[76] Inventor: Noel S. Paterson, 17834 147th Pl., NE., Woodinville, Wash. 98072

[21] Appl. No.: 401,555

[22] Filed: Mar. 9, 1995

[51] Int. Cl.⁶ ............................................. G08B 23/00
[52] U.S. Cl. ..................... 340/970; 340/946; 340/963
[58] Field of Search ...................... 340/970, 963, 340/946; 342/65; 364/433; 73/178 T; 244/180

[56] References Cited

U.S. PATENT DOCUMENTS

| | | |
|---|---|---|
| 3,715,718 | 2/1973 | Astengo .................................. 340/970 |
| 3,946,358 | 3/1976 | Bateman . |
| 3,947,808 | 3/1976 | Bateman . |
| 3,947,810 | 3/1976 | Bateman et al. . |
| 4,319,218 | 3/1982 | Bateman . |
| 4,431,994 | 2/1984 | Gemin .................................... 340/970 |
| 4,495,483 | 1/1985 | Bateman ................................. 340/970 |
| 4,551,723 | 11/1985 | Paterson . |
| 4,818,992 | 4/1989 | Paterson . |
| 4,939,513 | 7/1990 | Paterson et al. ....................... 340/970 |
| 4,980,684 | 12/1990 | Paterson et al. . |
| 4,987,413 | 1/1991 | Grove . |
| 5,283,574 | 2/1994 | Grove .................................... 340/970 |

*Primary Examiner*—Brent A. Swarthout

[57] ABSTRACT

A ground proximity warning system (GPWS) for a rotary-wing aircraft provides a warning of excessive barometric altitude loss as a function of the product of time and the terrain clearance. The warning system is only enabled during a take-off mode of flight and is disabled during other modes of flight. The mode warning logic monitors the speed of the aircraft, the terrain clearance of the aircraft as well as the position of the landing gear to enable the altitude loss warning logic. When the barometric altitude loss as a function of the time product of the terrain clearance exceeds a predetermined value, the mode switching logic switches to an approach mode of flight to disable the excessive altitude loss warning system to minimize nuisance warnings during various maneuvers including ship-to-ship and oil platform-to-oil platform flight maneuvers.

11 Claims, 4 Drawing Sheets

HELICOPTER ENHANCED DESCENT AFTER TAKE-OFF WARNING FOR GPWS

BACKGROUND OF THE INVENTION

1. Field of the Invention

The present invention relates to a ground proximity warning system (GPWS) for a rotary-wing aircraft, and more particularly to an excessive altitude loss after take-off warning system for a rotary-wing aircraft which provides a warning of loss of barometric altitude after take-off as a function of the product of time and terrain clearance during take-off and go-around-after-a-missed-approach modes of flight, which minimizes nuisance warnings during certain flight maneuvers, such as ship-to-ship and oil platform-to-oil platform maneuvers by such rotary wing aircraft.

2. Description of the Prior Art

Ground proximity warning systems that warn of aircraft descent after takeoff or during a go-around after missed approach are known. Examples of such systems are disclosed in U.S. Pat. Nos. 3,946,358; 3,947,808; 3,947,810; and 4,319,218, assigned to the same assignee as the present invention. The systems disclosed in the '358 and '808 patents provide a warning if the descent rate of the aircraft exceeds a predetermined rate below a given altitude. The systems disclosed in the '810 and '218 patents generate a warning if the altitude loss after a take-off exceeds a predetermined value. While the systems mentioned above do provide a way to warn the pilot of an aircraft of a hazardous condition resulting from an excessive sink rate or from an excessive altitude loss after take-off or missed-approach phase of operation, such systems are generally designed for use in transport aircraft, and thus are not particularly suitable for use in highly maneuverable rotary-wing aircraft, such as helicopters, whose flight and operational characteristics are entirely different than those of transport aircraft. Consequently, such systems designed for transport aircraft can generate nuisance warnings during certain normal operational conditions of a rotary-wing aircraft and perhaps provide no warning or an inadequate warning during other flight conditions.

In order to resolve such problems, ground proximity warning systems for rotary-wing aircraft have been developed. Examples of ground proximity warnings systems for use in rotary wing aircraft are disclosed in U.S. Pat. Nos. 4,551,723; 4,818,992; and 4,980,684. While such systems provide adequate protection during most flight maneuvers, such systems may provide nuisance warnings during certain flight maneuvers, such as ship-to-ship and oil platform-to-oil platform maneuvers.

SUMMARY

It is an object of the present invention to provide an excessive altitude loss after take-off warning for rotary-wing aircraft that solves various problems in the prior art.

It is another object of the present invention to provide a ground proximity warning system for a rotary-wing aircraft which minimizes nuisance warnings during certain flight maneuvers, such as ship-to-ship and oil platform-to-oil platform flight maneuvers.

Briefly, the present invention relates to a ground proximity warning system (GPWS) for a rotary-wing aircraft and more particularly to an excessive altitude loss after take-off warning system which provides a warning of excessive barometric altitude loss as a function of the product of time and terrain clearance of the aircraft. The warning system is only enabled during take-off and go-around-after-a-missed-approach modes of flight and is disabled during other modes of flight. The mode warning logic monitors the speed of the aircraft, the terrain clearance of the aircraft as well as the position of the landing gear to enable the warning logic. When the barometric altitude loss as a function of the product of time and terrain clearance exceeds a predetermined value, the mode switching logic switches to an approach mode of flight to disable the excessive altitude loss warning system to minimize nuisance warnings during various maneuvers including ship-to-ship and oil platform-to-oil platform flight maneuvers.

BRIEF DESCRIPTION OF THE DRAWING

These and other objects of the present invention will be readily understood with reference to the following specification and attached drawing, wherein.

DETAILED DESCRIPTION OF THE PREFERRED EMBODIMENT

Figure 1:
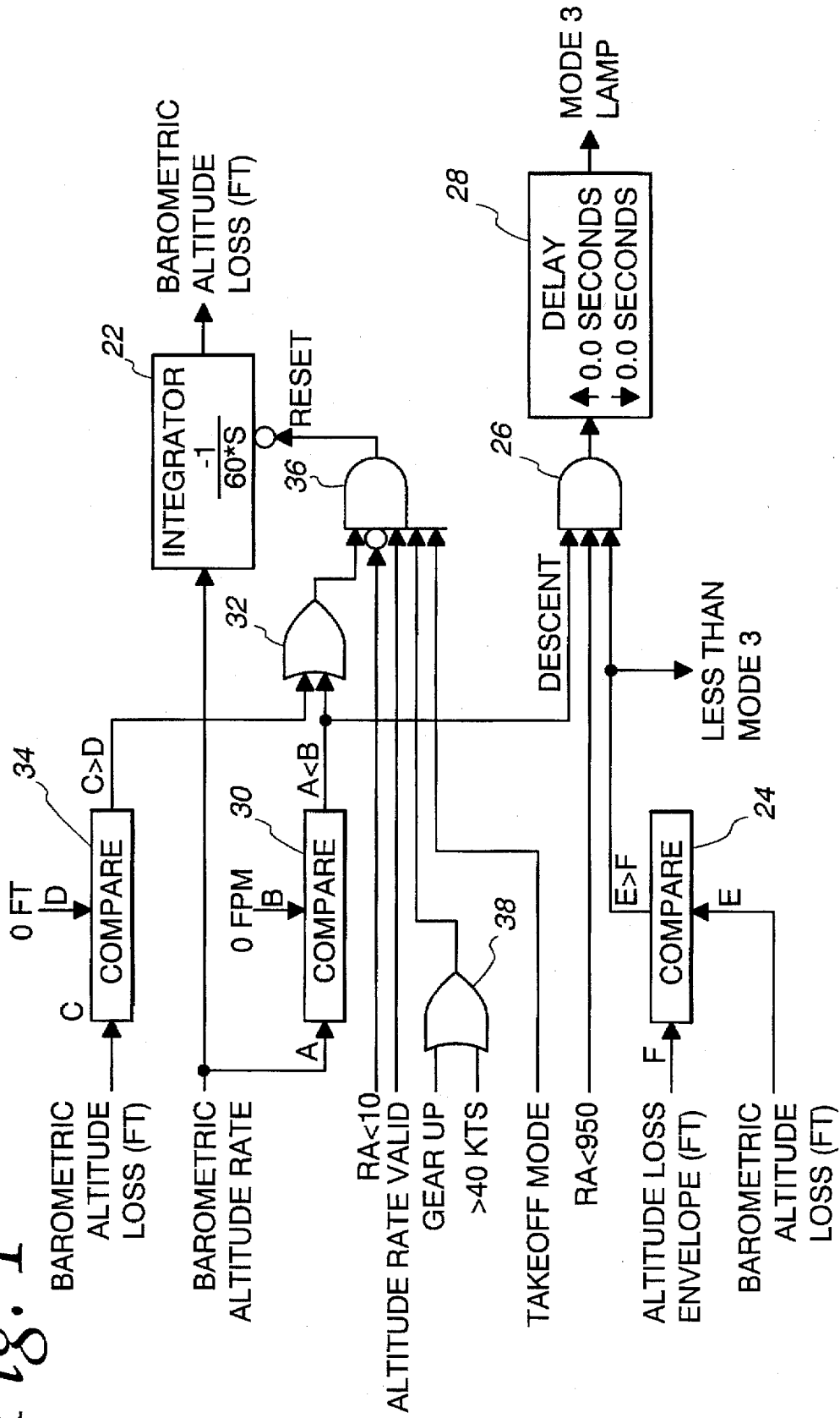
FIG. 1 is a block diagram of the excessive altitude loss during take-off warning system in accordance with the present invention.

An excessive altitude loss after take-off warning system for a rotary wing aircraft in accordance with the present invention is generally identified with the reference numeral 20. The system 20, according to the present invention, illustrated in FIGS. 1 and 3–6 in functional or logical block diagram form as a series of gates, comparators, and the like for purposes of illustration; however, it should be understood that the actual implementation of the logic can be other than that as shown in FIGS. 1 and 3–6, with various digital, analog and software implementations being possible.

The signals used by the warning system include radio altitude, barometric altitude, barometric altitude rate, airspeed, a signal representative of the position of the aircraft landing gear, a mission signal indicating whether the aircraft is in a tactical or non-tactical phase of flight and various validity signals. Depending on the type of aircraft in which the warning system is installed, the signals shown can be obtained from individual instruments, such as a barometric altimeter, a barometric altitude rate circuit, a radio altimeter, and airspeed signal source, which may be an air data computer or an air speed indicator and from discrete elements which indicate whether the aircraft is in a tactical or non-tactical phase of flight, and whether the landing gear is up or down. The barometric altitude rate signal may also be either an inertial velocity or an inertially corrected barometric altitude rate. In addition, when available, a global positioning system (GPS) altitude or an inertially derived barometric altitude are preferable. Alternatively, a portion of the signals may be received from a digital data bus in certain newer aircraft.

Figure 2:
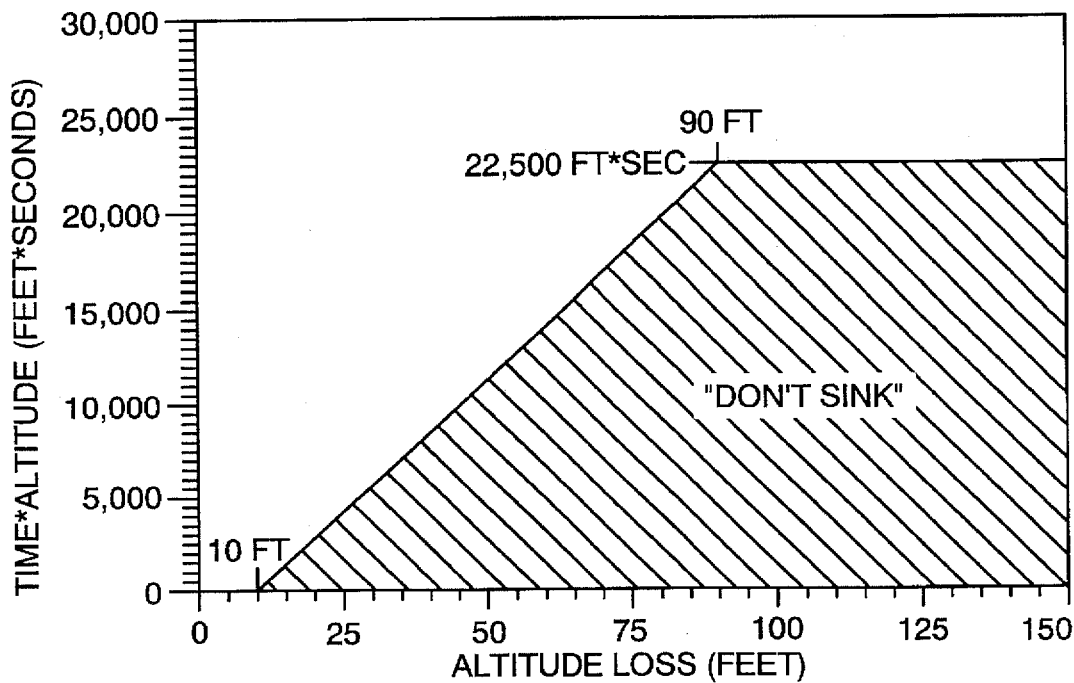
FIG. 2 is a graphical illustration of an altitude loss envelope for the excessive altitude loss during take-off warning system in accordance with the present invention.

In accordance with the present invention, the barometric altitude loss of a rotary wing aircraft is compared with a time-altitude loss warning envelope, illustrated in FIG. 2, to provide an excessive altitude loss after take-off warning as a function of the product of time since take-off and the terrain clearance of the aircraft. As will be discussed in more detail below, the altitude loss envelope, illustrated in FIG. 2, is generated by the circuitry illustrated in FIG. 3 to provide an ALTITUDE LOSS ENVELOPE signal. This ALTITUDE LOSS ENVELOPE signal is compared with a BAROMETRIC ALTITUDE LOSS signal, available at the output of an integrator 22 (FIG. 1) by way of a comparator 24. Whenever the BAROMETRIC ALTITUDE LOSS is greater than the ALTITUDE LOSS ENVELOPE (i.e. within the envelope illustrated in FIG. 2), an AND gate 26 will be enabled subject to the conditions discussed below to initiate a timer 28, which after a predetermined configurable delay, illustrated as 0 seconds, will generate a MODE 3 LAMP signal, representative of excessive altitude loss after take-off (also referred to herein as a MODE 3 warning signal).

As mentioned above, the BAROMETRIC ALTITUDE LOSS signal is available at the output of the integrator 22. In order to determine barometric altitude loss, a BAROMETRIC ALTITUDE RATE signal is applied to the input of the integrator 22 and integrated with respect to time to provide the BAROMETRIC ALTITUDE LOSS signal in feet. A scaling constant, for example −1/60, is selected for the integrator 22 to convert negative altitude rate in feet per minute of descent to positive feet of barometric altitude loss in feet.

The integrator 22 is enabled when the aircraft is descending and during ascending conditions until any altitude loss is regained. As such, the BAROMETRIC ALTITUDE RATE signal is compared with a reference signal representative of 0 feet per minute to determine the polarity of the BAROMETRIC ALTITUDE RATE signal by way of a comparator 30 and applied to one input of an OR gate 32, used to reset the integrator 22. The BAROMETRIC ALTITUDE LOSS signal is also compared with a reference signal representative of 0 feet by way of a comparator 34 and applied to another input of the OR gate 22. During ascent conditions, the integrator 22 is enabled until the BAROMETRIC ALTITUDE LOSS signal returns to 0 feet of altitude loss, indicating that the aircraft has regained all of the lost altitude from the beginning of the descent. Once the aircraft has regained all of its lost altitude and the aircraft is still ascending, the OR gate 32 will disable an AND gate 36 and reset the integrator 22.

There are various other inputs to the AND gate 36 which can reset the integrator 22. Normally, while the integrator 22 is active, output of the AND gate 36 is high, thus disabling the integrator RESET. Once the AND gate 36 is disabled, the integrator 22 is reset. With the exception of the signal RA<10, anytime one of the input signals goes low, the AND gate 36 is disabled, which, in turn, resets the integrator 22. The RA<10 is applied to an inverting input of the AND gate 36. This signal RA<10 is high from 0 to 10 feet of radio altitude, thus disabling the AND gate 36 when the radio altitude is 10 feet or less, which, in turn, resets the integrator 22. Once the radio altitude of the aircraft is greater than 10 feet, the signal RA<10 goes low.

In order to minimize spurious warnings, the AND gate 36 is also under the control of a two-input OR gate 38. The OR gate 38 disables the AND gate 36 when the speed of the aircraft is less than 40 knots and the gear is in a down position. During these conditions, the AND gate 36 is disabled and the integrator 22 is reset. Once the speed of the aircraft becomes greater than 40 knots or the landing gear goes up, the OR gate 38 will be enabled.

The integrator 22 is also reset when the BAROMETRIC ALTITUDE RATE signal is not valid and when the aircraft is not in a take-off mode of operation. As such, an ALTITUDE RATE VALID signal, as well as a TAKE-OFF MODE, are applied to the AND gate 36.

As mentioned above, the MODE 3 warning signal is available at the output of the timer 28, which, in turn, is driven by the AND gate 26. In order to avoid spurious warnings, the AND gate 26 is disabled when the radio altitude or terrain clearance is equal to or greater to a predetermined value, for example 950 feet. In addition, nuisance warnings are further minimized by enabling the AND gate 26 only during conditions when the aircraft is descending. As such, a DESCENT signal is used to enable the AND gate 26 during descent conditions (i.e. when the polarity of the altitude rate signal is negative). The DESCENT signal is available at the output of the comparator 30. Thus, anytime a recovery is initiated, the MODE 3 warning signal (i.e. AND gate 26) is disabled.

As indicated above, the ALTITUDE LOSS ENVELOPE signal, applied to the comparator 34, is illustrated in FIG. 2. The horizontal axis represents barometric altitude loss in feet while the vertical axis represents the product of time and terrain clearance in feet seconds. The altitude loss warning envelope begins at ten feet on the horizontal axis and provides a signal representative of barometric altitude loss as a function of accumulated or integrated terrain clearance with respect to time. The equation for the altitude loss envelope is provided below:

Barometric altitude loss (feet)=initial altitude (feet)*0.1+10 feet+ terrain clearance (feet)*time (seconds)*0.004 (feet/feet seconds)   1).

Figure 3:
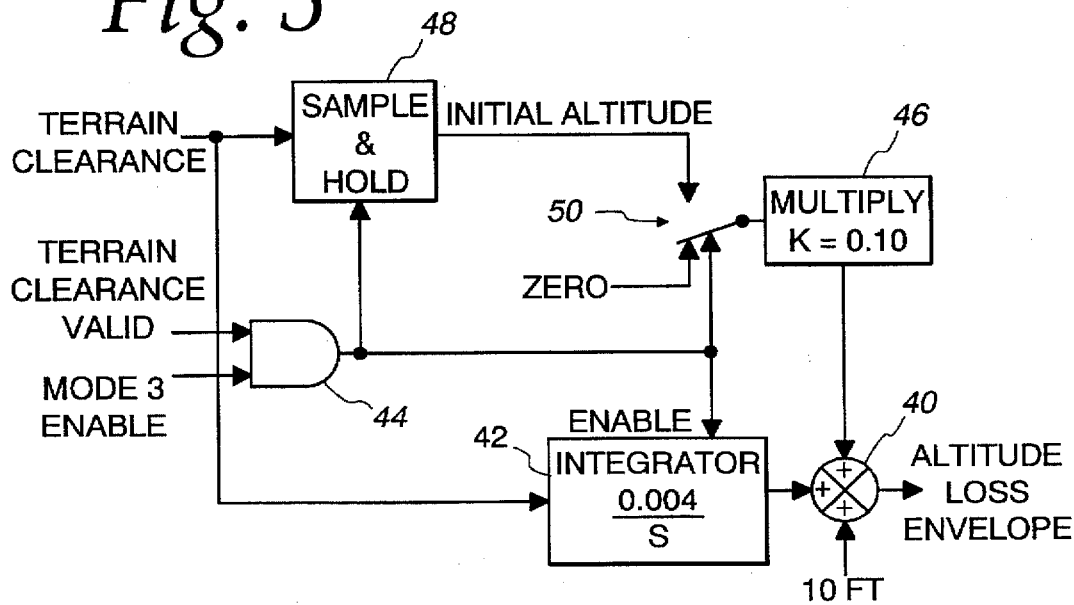
FIG. 3 is a block diagram of the control logic for generating the altitude loss envelope illustrated in FIG. 2.

The terrain clearance * time product signal is representative of the area under the flight path after take-off or go-around after a missed approach. This signal is provided by integrating the RADAR ALTITUDE or TERRAIN CLEARANCE signal when it is valid. More particularly, the ALTITUDE LOSS ENVELOPE signal may be generated by the circuitry illustrated in FIG. 3. Referring to FIG. 3, the ALTITUDE LOSS ENVELOPE signal is available at the output of a summing junction 40. An integrator 42 with a scaling constant, for example 0.004, is used to provide the time * radio altitude product signal discussed above. The input to the integrator 42 is a terrain clearance signal, available from the aircraft radio altimeter. The integrator 42 integrates the terrain clearance signal to provide the time altitude product signal discussed above under the control of an AND gate 44. In particular, the AND gate 44 is used to control an enable input of the integrator 42 to enable the integrator 42 when MODE 3 has been enabled (discussed below) and the TERRAIN CLEARANCE signal is valid. When these two conditions are true, the AND gate 44 enables the integrator 42 to enable the terrain clearance or radio altitude to be integrated with respect to time. The output of the integrator 42, in turn, is applied to a non-inverting input of the summing junction 40 where the product signal is summed with an INITIAL ALTITUDE signal and a reference altitude of 10 feet in accordance with the equation above.

The INITIAL ALTITUDE signal is generated by a multiplier 46, a sample and hold circuit 48 and a switch 50. In particular, the AND gate 44 controls the sample-and-hold circuit 48 to generate the INITIAL ALTITUDE term in the equation discussed above when the TERRAIN CLEAR- ANCE signal is valid and MODE 3 is enabled. During such conditions, the sample-and-hold circuit 48 samples the initial altitude, which, in turn, is multiplied by a predetermined scaling factor K, for example 0.10 by the multiplier 46 whose output is applied to a non-inverting input of the summing junction 40.

The switch 50 is used to reset the system when either the TERRAIN CLEARANCE signal is not valid or the MODE 3 signal is not enabled. The switch 50, for example a single-poll, double-throw switch, is under the control of the AND gate 44. During conditions when the AND gate 44 is disabled as a result of the TERRAIN CLEARANCE signal either being invalid or the MODE 3 signal being not enabled, the switch 50 will be in the position as shown in FIG. 3. During this condition, the integrator 42 will be reset as discussed above and a 0 altitude reference signal will be connected to the multiplier 46. When the TERRAIN CLEARANCE signal becomes valid and the MODE 3 signal becomes enabled, the switch 50 changes position to a position opposite of that shown in FIG. 3 to connect the INITIAL ALTITUDE signal, available at the output of the sample-and-hold circuit 48, to the multiplier 46.

Figure 4:
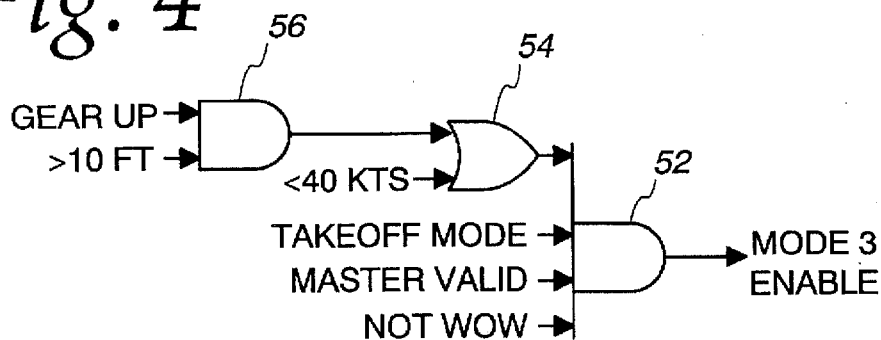
FIG. 4 is a block diagram of the control logic for enabling the warning system illustrated in FIG. 1.

The MODE 3 ENABLE signal is generated by the circuitry illustrated in FIG. 4. In particular, the MODE 3 ENABLE signal is available at the output of an AND gate 52. The AND gate 52 primarily enables the MODE 3 warning system during a take-off mode of operation. More particularly, a TAKE-OFF MODE signal is applied to one input of the AND gate 52. As will be discussed in more detail below, the TAKE-OFF mode signal, generated by the circuitry illustrated in FIG. 6, enables the MODE 3 warning signal (i.e. the AND gate 26, FIG. 1) during a take-off mode of operation. During approach and cruise modes, the TAKE-OFF MODE signal will be low, thus disabling the AND gate 52, and, in turn, the MODE 3 warning signal as discussed above. In order to prevent spurious operation of the MODE 3 warning signal, various signals are applied to the AND gate 52. For example, a MASTER VALID signal is applied to an input of the AND gate 52. The MASTER VALID signal is used to disable the AND gate 52 when any of the instruments providing signals to the system are faulty. A "NOT WOW" signal representative of no weight on wheels, available from a discrete, is applied to one input of the AND gate 52. The NOT WOW signal disables the AND gate 52 when the aircraft is on the ground. A greater than 40 knots airspeed signal is ORed by way of an OR gate 54 with the output of an AND gate 56. During conditions when the airspeed of the aircraft is less than 40 knots, the OR gate 54 will be under the control of the AND gate 56. A GEAR-UP signal, available from a discrete, is ANDed with a greater than ten feet signal, available from the radar altimeter, by way of the AND gate 56. Thus, once the aircraft becomes airborne and is at an altitude of greater than ten feet, the OR gate 54 will be enabled, which, in turn, will enable the AND gate 52.

Figure 5:
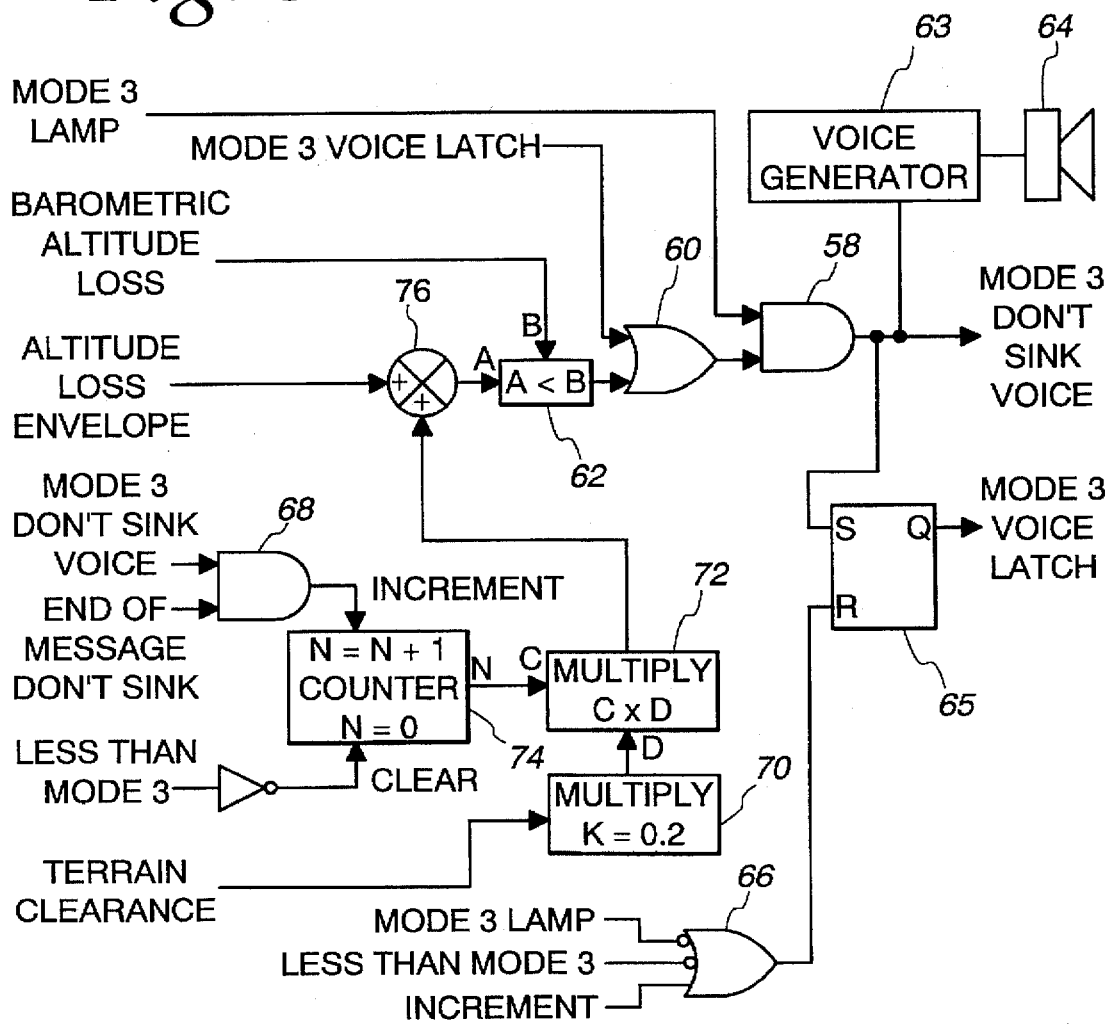
FIG. 5 is a block diagram of the control logic for controlling aural warnings generated by the warning system illustrated in FIG. 1.

During MODE 3 warning conditions, both aural and visual warnings are provided. In particular, a visual warning may be provided (identified as MODE 3 LAMP) at the output of the timer 28 (FIG. 1). In addition, different aural warnings may be provided. In particular, a "DON'T SINK" voice warning may be provided. More particularly, as shown in FIG. 5 and as will be discussed in detail below, two voice warnings are provided initially. The voice warnings are under the control of an AND gate 58. More particularly, a MODE 3 LAMP signal from the timer 28 (FIG. 1) is applied to one input of the AND gate 58. The other input of the AND gate 58 is under the control of an OR gate 60. Initially, at the onset of a MODE 3 warning, the BAROMETRIC ALTITUDE LOSS signal is compared with the ALTITUDE LOSS ENVELOPE signal by way of a comparator 62. Since the BAROMETRIC ALTITUDE LOSS signal will be greater than the ALTITUDE LOSS ENVELOPE signal, the output of the comparator 62 will enable the OR gate 60, which, in turn, will enable the AND gate 58 to provide a MODE 3 DON'T SINK Voice signal. The MODE 3 DON'T SINK VOICE signal is applied to a voice generator 63, which, in turn, may be connected to a headphone or loudspeaker 64. The voice generator 63 is preferably a digital voice generator which generates a "DON'T SINK—DON'T SINK" voice warning with each warning separated by a predetermined pause (i.e. 0.75 seconds) in response to the MODE 3 DON'T SINK Voice signal. At the end of the message (EOM), an END OF MESSAGE DON'T SINK signal is generated, which, as will be discussed below, is used to reset the system.

The output of the AND gate 58 is applied to a set input S of a voice latch 65. The Q output of a voice latch 65, in turn, is used to seal in the MODE 3 DON'T SINK voice signal by way of an OR gate 60. After the initial two aural warnings, as discussed above, the voice alert is biased to allow an additional altitude loss of 20 percent of the current terrain clearance. Thus, after the initial two voice warnings, if the aircraft does not lose additional altitude, no additional messages are given. However, should additional altitude be lost, two additional voice messages are given, and another 20 percent of the current terrain clearance is added to the allowed altitude loss envelope. This process is continued until the barometric altitude loss is outside of the ALTITUDE LOSS ENVELOPE. More particularly, after the initial two DON'T SINK voice warnings are provided, the voice latch 65 is reset by an OR gate 66. There are several inputs to the OR gate 66. In particular, a MODE 3 LAMP signal, as well as a LESS THAN MODE 3 signal, are applied to inverting inputs of the OR gate 66. The MODE 3 LAMP signal, available at the output of the timer 28 (FIG. 1), represents a condition when the barometric altitude loss is within the altitude loss envelope illustrated in FIG. 2. The LESS THAN MODE 3 signal is also applied to an inverting input of the OR gate 66. The LESS THAN MODE 3 signal is available at the output of the comparator 24 (FIG. 1) and represents a condition when the barometric altitude loss is within the altitude loss envelope illustrated in FIG. 2. Both the MODE 3 LAMP and LESS THAN MODE 3 signals will be high during conditions when the barometric altitude loss is within the ALTITUDE LOSS ENVELOPE, thus leaving the OR gate 66 under the control of an INCREMENT signal. The INCREMENT signal is under the control of an AND gate 68. A MODE 3 DON'T SINK voice signal is ANDed with the EOM signal to enable the AND gate 66. Thus, at the end of the two DON'T SINK aural warnings, the AND gate 68 will be high, which will enable the OR gate 66 and, in turn, reset the voice latch 65.

After the voice latch 65 has been reset, a terrain clearance bias is added to the altitude loss envelope. In particular, a signal representative of the terrain clearance, available from the radar altimeter, is applied to a multiplier 70 having a scaling constant K, for example 0.2. The output of the multiplier 70, which represents 20 percent of the available terrain clearance, is applied to a second multiplier 72 in which the 20percent terrain clearance value is multiplied by the output of a counter 74. Initially, the counter 74 is at 0. The counter 74 is incremented by way of the AND gate 68 which increments the counter 74 at the end of the DON'T SINK aural warnings. Thus, after the first two aural warnings are generated, the AND gate 68 will increment the counter 74 to 1, which, in turn, forms the multiplier constant for the multiplier 72, which, in turn, is multiplied by the output of the multiplier 70. Thus, for a condition when the output of the counter 74 is 1, a signal representative of 20% of the terrain clearance is applied to a positive input of a summing junction 76 in order to bias the ALTITUDE LOSS ENVELOPE signal applied to another positive input of the summing junction 76. The output of the summing junction 76, in turn, is compared with the BAROMETRIC ALTITUDE LOSS signal by way of the comparator 62. Should additional altitude equivalent to 20% of the terrain clearance be lost from the point of the first warning, the OR gate 60, and in turn the AND gate 58, will be enabled to provide two additional DON'T SINK voice warnings by way of the digital voice generator 63 and loudspeaker 64. At the end of these two voice warnings, the END OF MESSAGE signal, in turn, will reset the voice latch 65 as discussed above. Should additional altitude be lost, the process is repeated in 20% increments of the barometric altitude loss. If the aircraft does not lose additional altitude, then additional voice warnings are not provided.

Figure 6:
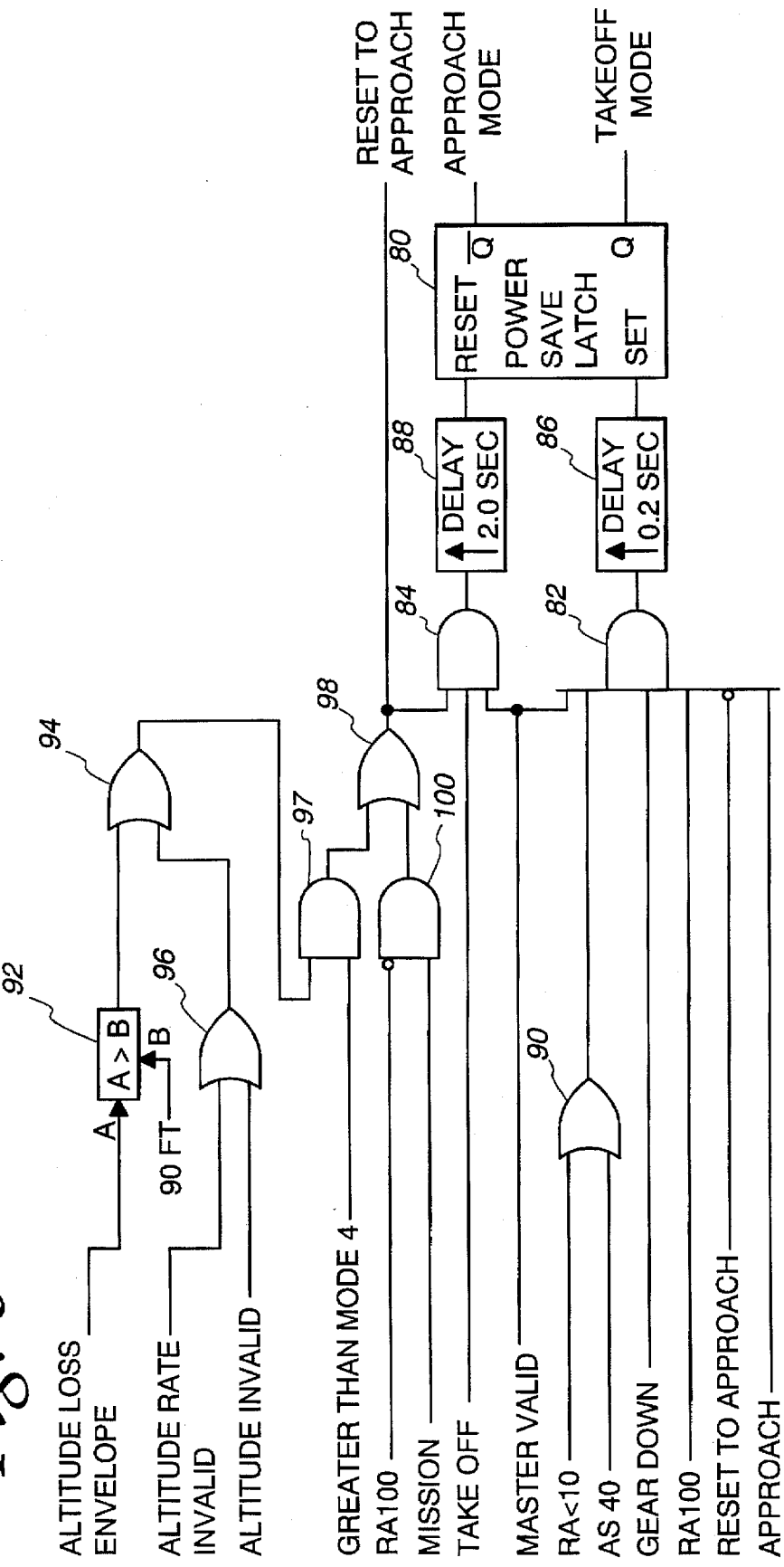
FIG. 6 is a block diagram of the control logic for the helicopter take-off/approach mode switching logic in accordance with the present invention.

An important aspect of the invention relates to the take-off/approach mode switching logic as illustrated in FIG. 6. In particular, a TAKE-OFF MODE signal, representative of a take-off mode, is available at a Q output of a latch 80. The $\overline{Q}$ output of a latch 80 represents the approach mode. As will be discussed in more detail below, switching from an approach mode to a take-off mode occurs when the aircraft passes below 100 feet and is flying at less than 60 knots with the landing gear in a down position. The latch 80 will switch from a take-off mode to an approach mode when the altitude loss envelopes exceed 90 feet or when the altitude or altitude rate data, which may be configurable by aircraft type, becomes invalid and when a GREATER THAN MODE 4 signal is asserted or when in a mission mode and flying above 100 feet.

Referring to FIG. 6, the SET and RESET inputs of the latch 80 are under the control of a pair of AND gates 82 and 84, respectively, whose outputs are, in turn, applied to a pair of delay circuits 86 and 88. The AND gate 82, after, for example a 0.2 second delay, enables the SET input of the latch 80 to indicate a take-off mode of operation. The AND gate 84, after, for example a 2.0 second delay, enables the RESET input of the latch 80 to indicate an approach mode of operation. As mentioned above, a TAKE-OFF MODE will be indicated anytime the aircraft is less than 100 feet of radio altitude and is flying at less than a predetermined airspeed, with its landing gear in a down position. Accordingly, a signal RA100, which represents that the aircraft radio altitude is 100 feet or less, is applied to one input of the AND gate 82. This signal, RA100, may be obtained from a comparator (not shown) with a fixed input representative of 100 feet to provide an enabling output signal whenever the radio altitude of the aircraft is less than 100 feet. A GEAR DOWN signal is applied to another input of the AND gate 82. The GEAR DOWN signal is available from a discrete on the landing gear. A signal AS 40 representative that the airspeed is 40 knots or less is ORed with another radio altitude signal RA<10, representative that the radio altitude is less than 10 feet by way of an OR gate 90, whose output, in turn, is applied to the AND gate 82. The signal RA<10 is used to enable the AND gate 82 during a take-off mode until such time that the airspeed reaches 40 knots. As long as the MASTER VALID signal is available, the AND gate 82 will be enabled.

An APPROACH MODE is indicated when the altitude loss envelope exceeds 90 feet, or the altitude rate or altitude signal becomes invalid. In particular, the altitude loss signal is applied to one input of a comparator 92, along with a signal representative of 90 feet. The output of the comparator 92 is applied to an OR gate 94. Signals representative of the ALTITUDE RATE INVALID and ALTITUDE INVALID are ORed by way of an OR gate 96 and applied to the other input of the OR gate 94. Thus, when either the altitude loss envelope exceeds 90 feet or the altitude rate or altitude signal is invalid, the OR gate 94 is enabled. The output of the OR gate 94 is ANDed with a GREATER THAN MODE 4 signal by way of an AND gate 97, whose output, in turn, is ORed by way of an OR gate 98 with the output of an AND gate 100. Two inputs are applied to the AND gate 100. An RA100 signal, representative of a radio altitude of 100 feet or less, is applied to an inverting input of the AND gate 100. A MISSION signal is applied to a non-inverting input of the AND gate 100. Thus, as mentioned above, the mode switching logic illustrated in FIG. 6 will switch from a take-off mode to an approach mode whenever the ALTITUDE LOSS ENVELOPE is greater than 90 feet or when either the altitude or altitude rate signals become invalid when the terrain clearance is outside of the MODE 4 warning boundary unless the aircraft is in a MISSION mode and flying at radio altitudes of less than 100 feet. A MODE 4 warning system is disclosed in U.S. Pat. No. 4,987,413, hereby incorporated by reference.

Whenever the OR gate 98 is enabled, a RESET TO APPROACH signal is generated, used to disable the AND gate 82 to disable relatching of the TAKE-OFF signal. In addition, the output of the OR gate 98 is ANDed with a TAKE-OFF signal and a MASTER VALID signal by way of the AND gate 84. Thus, whenever the OR gate 98 is enabled and latch 80 indicates a TAKE-OFF MODE (i.e. the Q output is high), the latch 80 will be reset after the 2.0 second delay by the timer 88 as long as the MASTER VALID signal is set to reset the latch 80 in order to indicate an APPROACH MODE at the $\overline{Q}$ output.

In order to avoid false indications of a TAKE-OFF MODE and an APPROACH MODE, an APPROACH signal is used to interlock the AND gate 82 while a TAKE-OFF signal is used to interlock the AND gate 84 to provide sequential switching from a take-off mode to an approach mode and from an approach mode to a take-off mode. In particular, during an approach mode, the APPROACH signal will be active high and applied to the AND gate 82 when the other conditions mentioned above for a take-off condition are valid for at least 0.2 seconds, the latch 80 is set, thus providing a TAKE-OFF signal at the Q output of the latch. After the TAKE-OFF signal is available at the Q output of the latch 80, the AND gate 82 will be disabled. This TAKE-OFF signal is then applied to the AND gate 84 as a condition to switch to an approach mode when the conditions for such mode as discussed below exist for the time period of the timer 88.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for providing a warning to the pilot of a rotary wing aircraft of excessive altitude loss during a take-off mode of operation, the warning system comprising:

means for receiving signals representative of the barometric altitude of the rotary wing aircraft;

means for receiving signals representative of the radio altitude of the rotary wing aircraft;

means for determining the barometric altitude loss of the rotary wing aircraft;

means for integrating only said radio altitude signal to generate a time altitude product signal representative of the area under the flight path curve after take-off or go-around after a missed approach; and means for comparing the barometric altitude loss of the rotary wing aircraft with said time altitude product signal and generating a warning signal representative of excessive barometric altitude loss as a function of the time altitude product signal.

2. A warning system as recited in claim 1, further including means for inhibiting said generating means unless the aircraft is in a take-off mode of operation.

3. A warning system as recited in claim 2, wherein said aircraft includes retractable landing gear and further including means for receiving signals representative of the position of the landing gear and the airspeed of the aircraft and for generating a signal representative of a take-off mode of operation as a function of the position of the landing gear, the airspeed of the aircraft and the radio altitude of the aircraft.

4. A warning system as recited in claim 1, wherein said barometric altitude receiving means includes means for receiving signals representative of the barometric altitude rate of the aircraft and means for integrating said barometric altitude rate signal under predetermined conditions.

5. A warning system as recited in claim 4, further including means for resetting said integrating means under predetermined conditions.

6. A warning system as recited in claim 5, wherein said predetermined conditions include the condition when the aircraft is ascending and has regained any lost barometric altitude since take-off.

7. A warning system as recited in claim 1, further including means for determining when said aircraft is ascending and inhibiting said generating means when said aircraft is ascending.

8. A warning system as recited in claim 1, further including means for inhibiting said generating means when the radio altitude of said aircraft is greater than a predetermined value.

9. A warning system as recited in claim 1, wherein said generating means includes means for integrating said radio altitude signals.

10. A warning system as recited in claim 9, further including means for inhibiting said radio altitude signal integrating means when said aircraft is not in a take-off mode of operation.

11. A warning system as recited in claim 1, wherein said generating means includes means for generating aural warning signals as a function of said excessive barometric altitude loss and further includes means for biasing said excessive barometric altitude loss signal for providing aural warnings of excessive barometric altitude loss as a function of terrain clearance.

* * * * *